(12) United States Patent
Garver et al.

(10) Patent No.: US 6,246,749 B1
(45) Date of Patent: *Jun. 12, 2001

(54) NETWORK INTERFACE UNIT AND MODULE

(75) Inventors: William Joseph Garver, Harrisburg; James Michael Raudenbush, Halifax, both of PA (US)

(73) Assignee: The Whitaker Corporation, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,626

(22) Filed: Jan. 30, 1998

Related U.S. Application Data
(60) Provisional application No. 60/036,797, filed on Jan. 31, 1997.

(51) Int. Cl.[7] .................................................... H04M 1/24
(52) U.S. Cl. ............................. 379/29; 379/399; 379/412
(58) Field of Search ................................... 379/1, 27, 29, 379/30, 399, 412, 328

(56) References Cited

U.S. PATENT DOCUMENTS

| D. 347,618 | 6/1994 | Butler, III et al. ................ D13/133 |
| 4,562,311 | * 12/1985 | Dola ........................................ 379/27 |
| 4,582,960 | * 4/1986 | DeLuca et al. ......................... 379/27 |
| 4,809,323 | 2/1989 | Collins et al. ........................ 379/399 |
| 4,827,504 | 5/1989 | Collins et al. ........................ 379/399 |
| 4,910,770 | * 3/1990 | Collins et al. ........................ 379/399 |
| 4,932,051 | 6/1990 | Karan et al. .......................... 379/399 |
| 4,945,559 | * 7/1990 | Collins et al. ........................ 379/399 |
| 4,945,560 | 7/1990 | Collins et al. ........................ 379/399 |
| 4,949,376 | 8/1990 | Nieves et al. ........................ 379/399 |
| 4,979,209 | 12/1990 | Collins et al. ........................ 379/399 |
| 5,260,994 | * 11/1993 | Suffi ....................................... 379/27 |
| 5,313,519 | 5/1994 | Mickelson et al. .................. 379/399 |
| 5,333,193 | 7/1994 | Cote et al. ............................ 379/399 |
| 5,378,160 | * 1/1995 | Yumibe et al. ......................... 439/66 |
| 5,394,466 | 2/1995 | Schneider et al. ................... 379/399 |
| 5,414,765 | 5/1995 | Lanquist et al. ..................... 379/399 |
| 5,416,837 | 5/1995 | Cote et al. ............................ 379/399 |
| 5,479,505 | 12/1995 | Butler et al. ......................... 379/412 |
| 5,497,416 | 3/1996 | Butler, III et al. ................... 379/399 |
| 5,528,684 | * 6/1996 | Schneider et al. ................... 379/399 |
| 5,548,641 | * 8/1996 | Butler et al. ......................... 379/399 |
| 5,553,136 | * 9/1996 | Meyerhoefer et al. ................ 379/29 |
| 5,625,686 | * 4/1997 | Capper et al. ......................... 379/27 |

FOREIGN PATENT DOCUMENTS

| 2255694 | 11/1992 | (GB) ............................. H04L/12/28 |
| WO 95/32533 | 11/1995 | (WO) ........................... H01R/13/703 |
| WO 95/32575 | 11/1995 | (WO) ............................. H04M/1/02 |
| WO 96/25824 | * 8/1996 | (WO) . |

OTHER PUBLICATIONS

International Search Report in corresponding PCT/US98/01870 mailed Jul. 30, 1998; three pages.

* cited by examiner

Primary Examiner—Stella Woo
Assistant Examiner—Quoc Tran

(57) ABSTRACT

A network interface module 50 is provided for mounting in a network interface unit 31. The module 50 is located in an accessible subscriber section 34. A circuit board 44 is located in a inaccessible service provider section 32. The two sections of the unit 31 are separated by a wall 36. The module 50 has an electrical connector 56 for terminating a subscriber line, a test receptacle 52, and a board receiving connector 54 for connecting to the service provider circuit board 44 located in the service provider section 32 of the unit 31. The module is designed to effect a connection to the service provider circuit board 44 without accessing the service provider section 32.

26 Claims, 5 Drawing Sheets

NETWORK INTERFACE UNIT AND MODULE

This application claims benefit of provisional application No. 60/036,797, filed Jan. 31, 1997.

FIELD OF THE INVENTION

This invention is related to a network interface unit (NIU) which is the interface between a service provider and a subscriber. More particularly, the invention is related to an improved network interface module (NIM) for use in the network interface unit.

BACKGROUND OF THE INVENTION

Network interface units (NIUs) are well known in the telephone industry as the interface between the telephone service provider and each subscriber. An example of such an NIU is shown in FIG. 1 in U.S. Pat. No. 4,979,209. This enclosure is typically installed at the subscriber location and serves as a demarcation point between the subscriber premise wiring and the telephone company line. The NIU provides a subscriber section which is accessible to the subscriber and a service provider section which is restricted from access by the subscriber. The service provider section typically contains the main telephone lines coming from the central office of the telephone service provider.

A network interface module (NIM) is placed in the subscriber section and is typically connected to the service provider section through a pair of wires which cross the sections and terminate within the subscriber section. The NIM serves to assist a subscriber in determining whether a fault exists on the incoming telephone company wiring or the subscriber premise wiring as is well known in the industry. An example of such a module is shown in FIGS. 1, 2, and 3. The NIM 10 snaps into a latching feature 16 of the NIU enclosure to secure the module into the NIU. Electrical connection to the telephone service provider line is accomplished through a pair of wires 12. A second pair of wires 18 is connected to the subscriber's telephone within the premise. As is shown in FIG. 3, the pair 12 is draped over a divider 20 which is typically placed between the subscriber section and the service provider section of the enclosure. The pair 12 is then connected to posts inside the service provider section.

The industry is currently moving towards a multiservice NIU which will be capable of providing several services such as telephony, high speed data, interactive services, and cable TV. An example of this multiservice NIU is disclosed by Motorola on their internet web site http://www.mot.com/multimedia/prod/specs/avnit.htm) as a Cable Access Unit. Such units will have a similar arrangement in that a subscriber section will be provided along with a service provider section. However, the service provider section will contain electronics for separating multiple services which are coming into the unit on a single cable into a plurality of discrete services such as cable TV, telephony, etc. to be supplied to the subscriber premise on separate circuits.

A problem exists in that the units described above require a wire to pass between the accessible and inaccessible portions of the NIU. This requires a multistep operation for installation of module. For example the module must first be mechanically secured to the unit and then be electrically connected in another step.

Another problem exists with these multiservice NIUs in that the service provider must install each of the network interface modules because the termination point at terminals 22 is inside the service provider section which is not accessible to the subscriber. It is therefore desirable to give the subscriber the ability to change modules by simply accessing the subscriber section. It is also desirable to be provide a module capable of being secured and electrically connected to the unit in a single step.

SUMMARY OF THE INVENTION

It is an object of this invention to overcome the problems of the prior art by providing an improved network interface module which is installable by simply accessing the subscriber section of the NIU without accessing the service provider section.

It is an additional object of this invention to provide an improved network interface module capable of being mechanically secured and electrically connected to the NIU in a single step.

These and objects have been achieved by providing an NIM which is latchable into a subscriber section of the NIU and electrically connected to circuits in the service provider section through a connection arrangement which is disposed in the vicinity of a wall dividing the subscriber section from the service provider section.

BRIEF DESCRIPTION OF THE DRAWINGS

The invention will now be described by way of example with reference to the accompanying figures of which.

DETAILED DESCRIPTION OF THE EMBODIMENT

Figure 1:
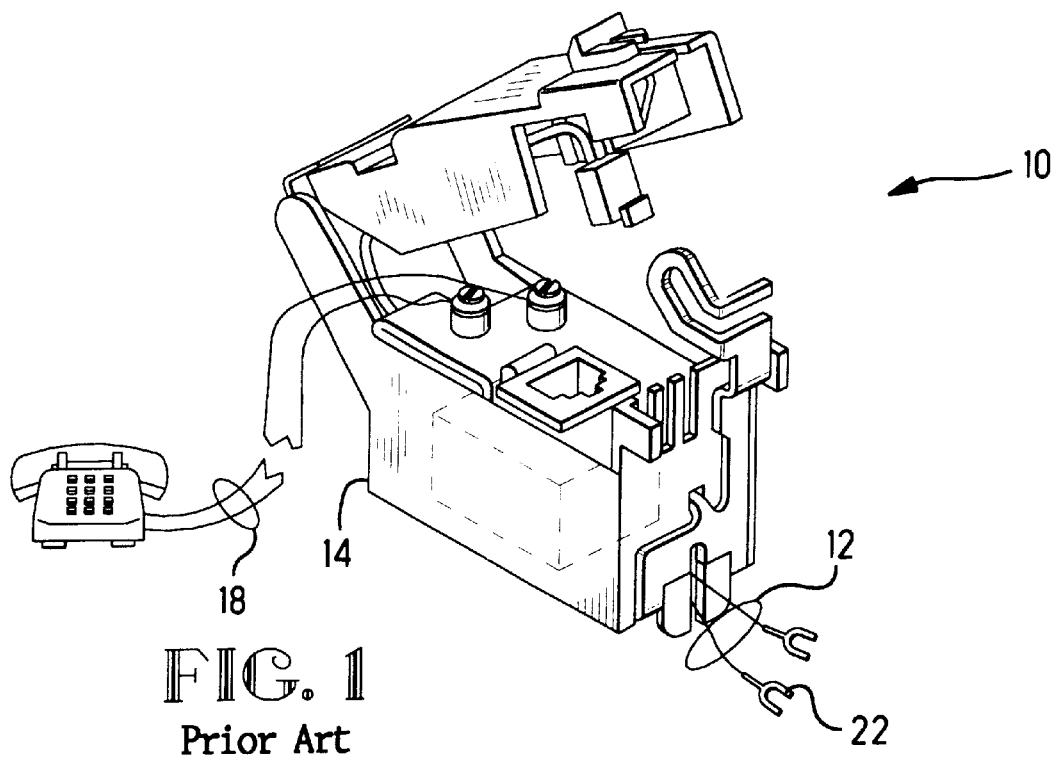
FIG. 1 shows a three-dimensional view of a prior art network interface module.
Figure 2:
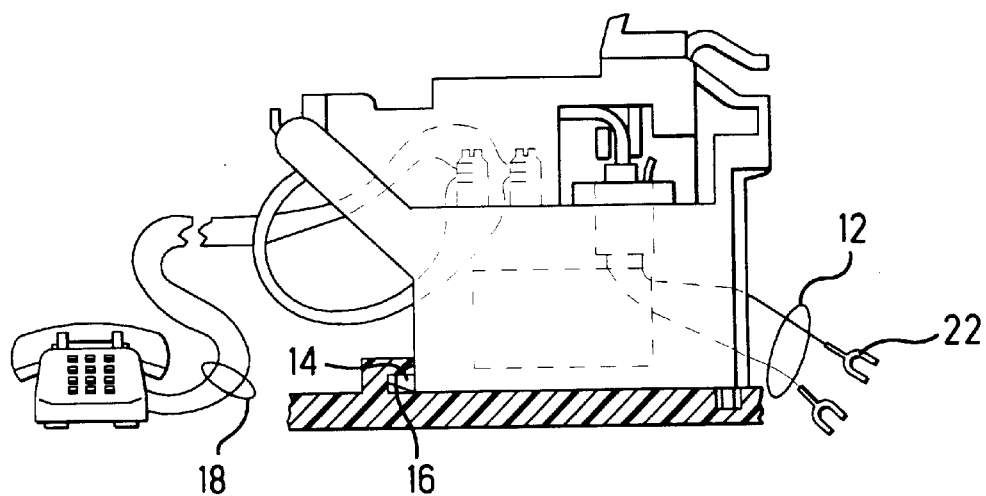
FIG. 2 shows a side view of the network interface module of FIG. 1.
Figure 3:
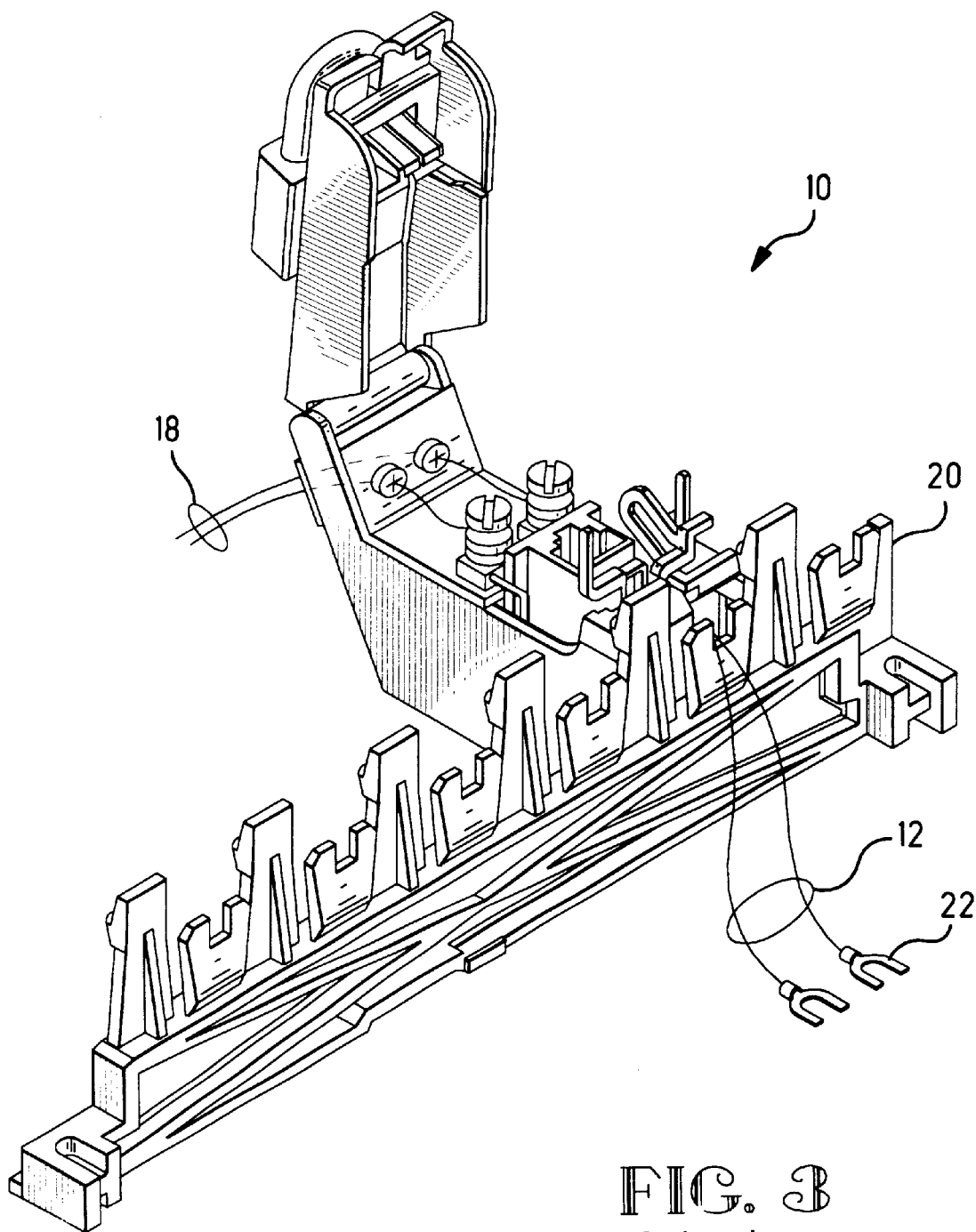
FIG. 3 shows a three-dimensional view of a network interface module and a divider wall of a network interface unit.
Figure 4:
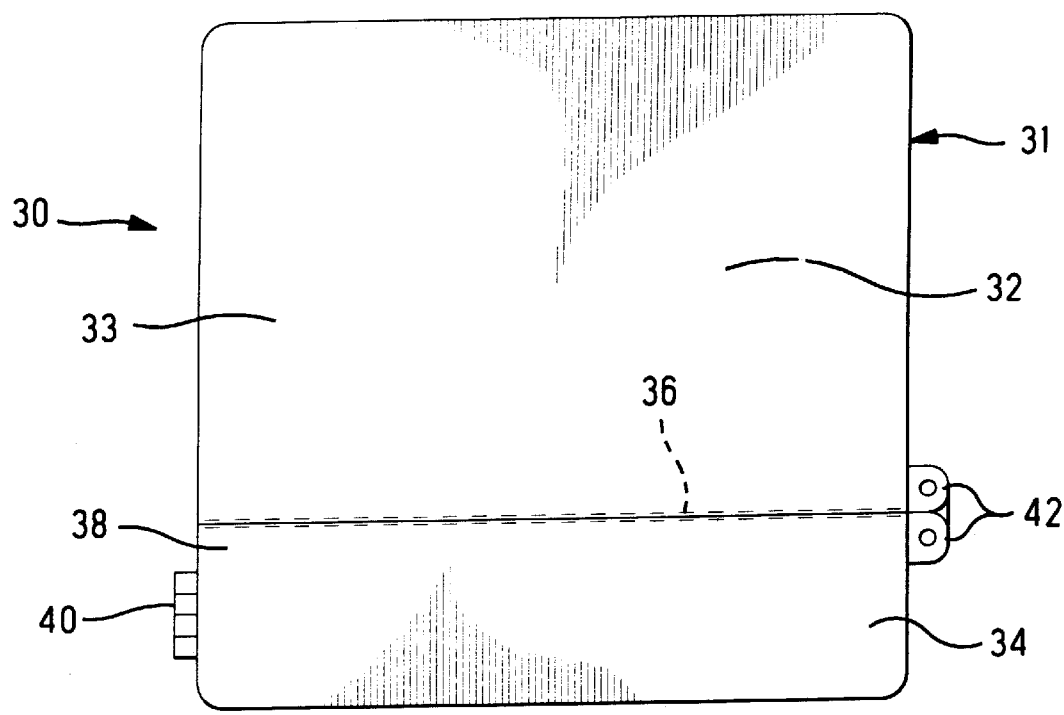
FIG. 4 shows a front view of a network interface unit.
Figure 5:
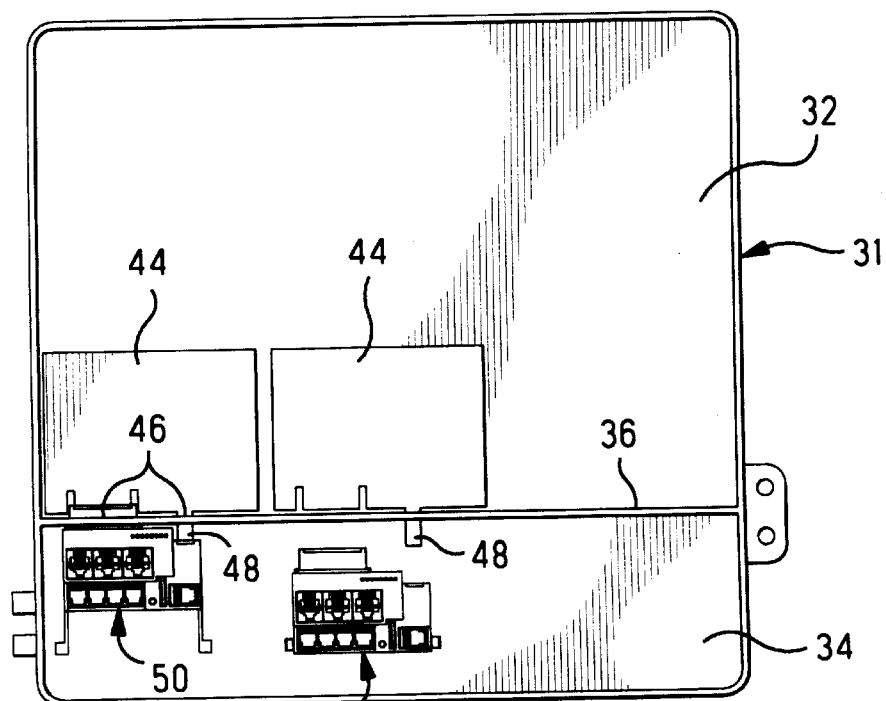
FIG. 5 shows a front view of the inside of the network interface unit of FIG. 4.

A multiservice network interface unit (NIU) 30 is shown in FIGS. 4 and 5 having an enclosure 31. The enclosure 31 is split into two sections. The first section being the service provider section 32, and the second section being the subscriber section 34. The service provider section 32 contains at least one printed circuit board 44 with electronics for receiving a single cable containing multiple services, and splitting the services into a plurality of different circuits which are then output to the subscriber section 34 at various locations. While FIG. 5 shows several circuit boards 44, it should be noted that the subscriber section 32 may contain one or several circuit boards 44. Each of these boards may be designed to receive a singular service such as telephony or multiple services such as CATV, high speed data transmission etc.

The subscriber section 34 is separated from the service provider section 32 by a dividing wall 36 shown in phantom in FIG. 4. A cover 33 is secured over the service provider section 32. An access door 38 is hingeably attached to the enclosure 31 by hinges 40 on one side. Securing means 42 is also provided along the opposite side of the enclosure 31 for securing the access door 38 in a closed position. When the access door 38 is in the open position, a subscriber has access to the subscriber section 34 but is blocked from access to the service provider section 32 by the dividing wall 36. FIG. 5 shows both the access door 38 and the cover 33 removed, but it should be understood that when the access door 38 is open, only the subscriber section 34 is exposed. The service provider section 32 remains covered and inaccessible.

Referring again to FIG. 5, it should be noted that this figure shows only a representation of only the major components inside the NIU 30 for indicating their placement inside the enclosure 31. Other components or network interface modules (NIMs) may be included in the enclosure 31 depending on the services needed in each specific application. For example, a NIM for CATV, or a NIM for data transmission, or a NIM for interactive services, may be placed in the subscriber section 34 with connections to a printed circuit board 44 in the service provider section 32. At least one printed circuit board 44 is provided inside the service provider section 32 and extends through openings 46 in the dividing wall 36. Extended portions 48 of the printed circuit board 44 extend from the openings 46 into the subscriber section 34. These extending portions 48 have exposed circuit traces on their surfaces for interfacing with the NIMs 50 in the subscriber section 34.

Figure 6:
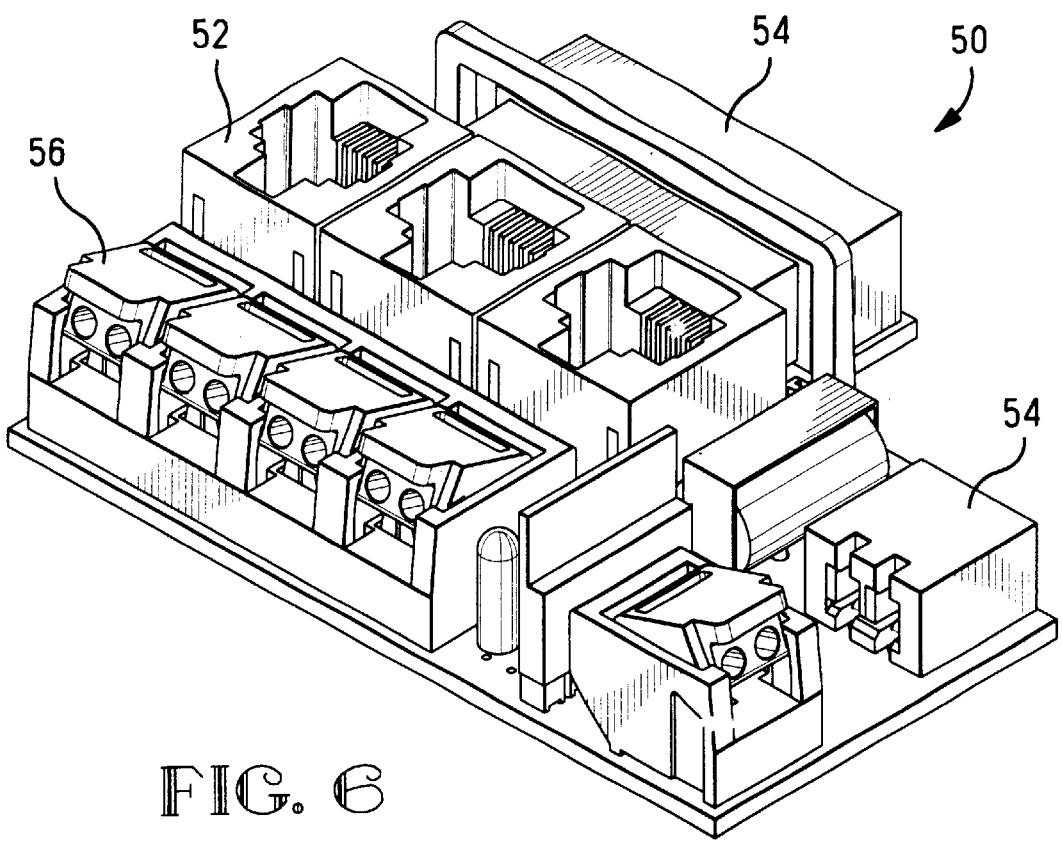
FIG. 6 shows a three dimensional view of the network interface module according to the present invention.
Figure 8:
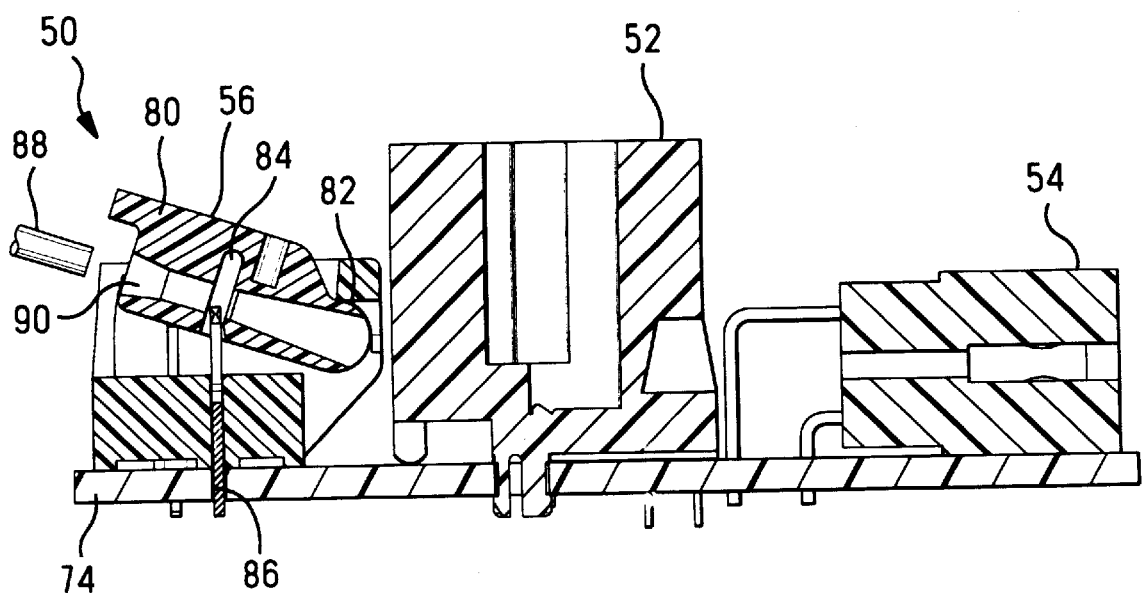
FIG. 8 shows a cross sectional view of the network interface module of FIG. 6.
Figure 7:
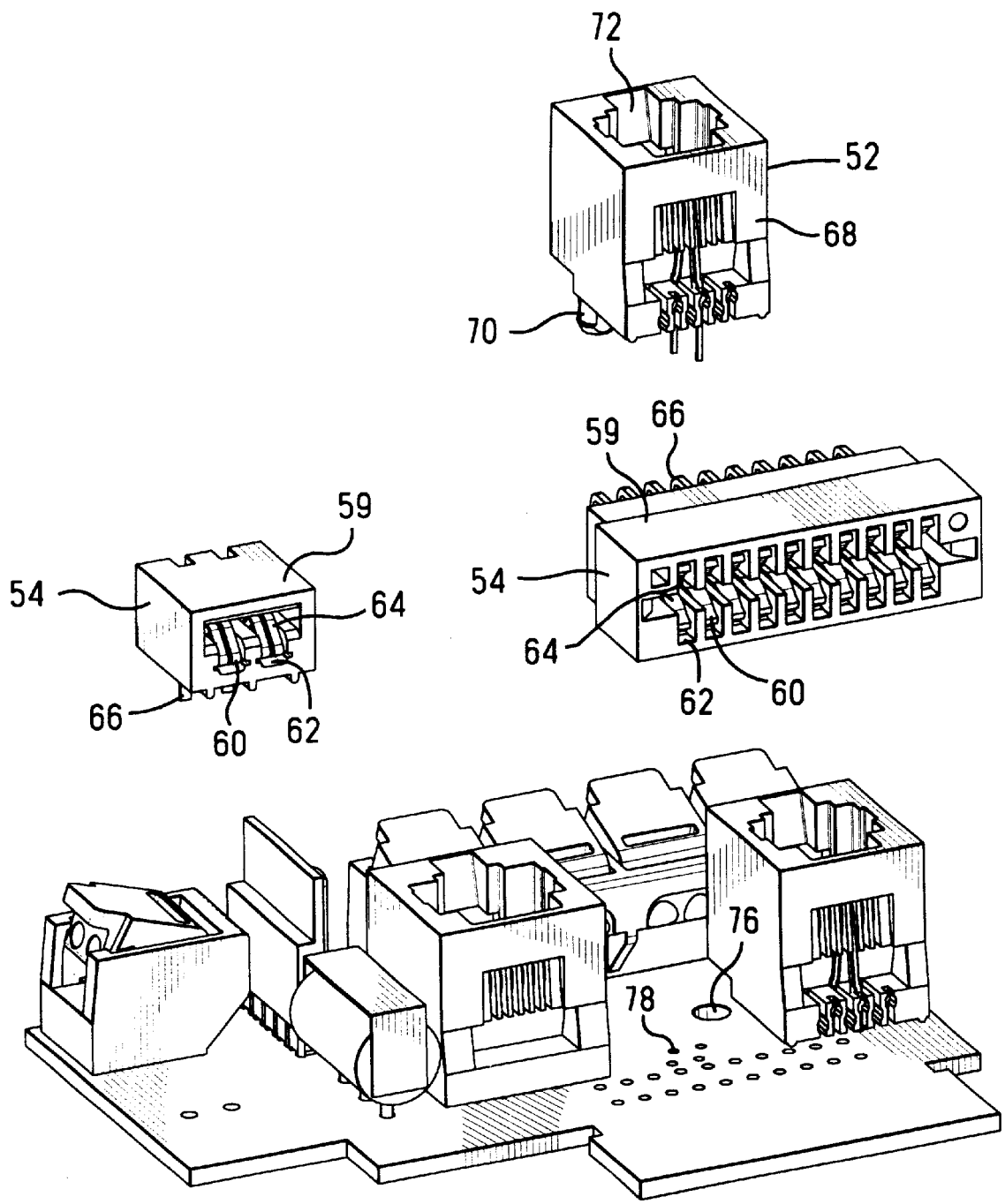
FIG. 7 shows a three-dimensional partially exploded view of the network interface module of FIG. 6.

The subscriber section 34 contains a plurality of network interface modules (NIMs) 50 located adjacent the openings 46 in the dividing wall 36. Referring now to FIGS. 6–8, each NIM 50 contains at least one electrical connector 56 for connection to wires leading to the subscribers' telephone, at least one test receptacle 52, provision for connection to a ground bus (not shown), and at least one board receiving connector 54, for connection to traces on the printed circuit board extended portions 48 near the openings 36. It should be noted here that the provision for connection to a ground bus could be achieved by conventional means such as a grounding tab which is secured by a stud and nut in the unit. Alternatively one of the connectors 54 can be utilized to connect to ground traces on one of the extending portions 48.

The network interface module 50 will now be described in greater detail along with each of the major components contained therein. Beginning at the first end closest to the dividing wall 36, the location of each of the major components of the NIM 50 will now be described. First, board receiving connectors 54 are disposed at the edge closest to the wall 36. Test receptacles 52 are provided adjacent the board receiving connector 54 and pivot connectors 56 are provided adjacent the test receptacles 52.

Each of the major components of the NIM 50 will now be described in greater detail. Referring first to FIG. 7, the board receiving connectors 54 are shown each having an insulative housing 59. The insulative housings 59 feature contact-receiving openings 62. Each contact-receiving opening 62 is profiled to receive a contact 60. The contact 60 is profiled to have a board-mating section 64 and a tail 66. As shown in FIG. 7 the board mating section 64 may be profiled to either contact traces on one side of a circuit board or traces on both sides of a circuit board. It should also be understood that the tail 66 here is shown for through hole mounting to a printed circuit board; however, a surface mount tail could be provided in its place. Two board receiving connectors 54 are shown here in this NIM 50. In this embodiment one is for connecting external power to the NIM 50 and the other is for connecting a plurality of signal lines to the NIM 50. It should be understood however, that the quantity and specific type of connectors 54 are application specific. For example if there is no requirement for external power connection to the NIM 50, then the two position connector 54 could be eliminated. Also, if there is a requirement to pass only a single telephony signal through the NIM 50, then only a singular two position board receiving connector 54 would be necessary. Similarly, if multiple high speed data signals were required that a multi-position board receiving connector could be applied to the NIM 50.

Referring again to FIG. 7, the test receptacle 52 is shown in greater detail. The test receptacle 52 features an insulative housing 68 having a plurality of board locks 70 for cooperation with openings 76 on a printed circuit board 74. A plug-receiving opening 72 is provided along a mating face for receiving a modular plug. A plurality of contacts are also disposed inside the plug-receiving opening 72 and extend into openings 78 in the printed circuit board 74. Again, the number of test receptacles provided in the NIM is application specific. Depending on the type and number of services passed through each NIM 50 the number of test receptacles 52 can be varied. For example, a test receptacle 52 is typically provided for each telephony line consisting of a pair of wires.

Referring now to FIG. 8, a cross sectional view of the NIM 50 is shown. The pivot connectors 56 are located at the end of the NIM 50 which is opposite the board receiving connectors 54. The pivot connectors 56 consist of a pivotable carrier 80 being hingeably attached to the assembly at a pivot mechanism 82. Contact-receiving passageways 84 are profiled to receive insulation displacement contacts 86 which are electrically connected to the printed circuit board 74. A pair of wires 88 are insertable through the wire-receiving openings 90 which extends from the mating end through the contact-receiving passageways 84. The pivoting connector 56 is profiled to receive a pair of unstripped wires 88 into the wire-receiving passageways 90 while in an unterminated position. The carrier 80 is then rotatable to a terminated position whereby the insulation displacement contacts 86 will pierce the insulation of the wires 88 and make an electrical connection thereto.

It should be noted at this point that each of the major components described above are mounted on and electrically interconnected by a printed circuit board 74 inside the NIM 50.

The NIM 50 is insertable into the subscriber section 34 of the NIU 30 by inserting it such that the board receiving connector 54 terminates to the traces on the printed circuit board 48 and is then rotated downward into the subscriber section 34 such that it latches into the subscriber section using a suitable latching mechanism. For example, FIG. 5 shows such a latching mechanism as having a pair of feet on the NIM 50 which fit into a pair of guide grooves which hold the NIM 50 into the subscriber section 34 while allowing it to slide for easy connection and removal from the unit 30.

Variations on the network interface module of the present invention would be obvious to those reasonably skilled in the art while remaining within the general spirit of the invention. For example, the interface between the NIM 50 and the service provider section 32 could be accomplished by having the board receiving connector 54 pass into the service provider section 32 or by having the circuit board extension portion 48 extend through the wall 36 into the subscriber section 34. Both variations are shown in FIG. 5.

Also the major components of the NIM could be substituted. For example, substitutions could be made as described above or the pivoting connector could be substituted with another connector suitable for terminating standard twisted pair telephone wire.

An advantage of this invention is that it provides a network interface module which is capable of being insertable and interchangeable by access to the subscriber section of a network interface unit without accessing the surface provider section of the unit.

An additional advantage of this invention is that different services can be provided through a singular NIU 31 by simply accessing the subscriber section 34 and changing a NIM 50.

We claim:

1. A network interface module for use with a network interface unit of a telecommunication system, the network interface unit having a subscriber section and a provider section, the provider side containing provider circuitry, the module comprising:
    a first electrical connector adapted for electrically connecting with the provider circuitry;
    a second electrical connector adapted for electrically connecting with subscriber signal lines;
    subscriber circuitry configured for electrically connecting the first electrical connector to the second electrical connector; and
    wherein the module is configured for placement in the subscriber section in an installed position such that, during placement of the module in the installed position, the electrical connection between the first electrical connector and the provider circuitry and the installation of the module in the subscriber section are effected in a single step.

2. The network interface module as recited in claim 1, further comprising a test receptacle adapted for electrically connecting to the provider circuitry when a plug is inserted into the test receptacle.

3. The network interface module as recited in claim 2, wherein the test receptacle comprises a switching mechanism which opens a circuit between the first and second electrical connectors when a plug is inserted into the receptacle while electrically connecting the inserted plug to the first electrical connector.

4. The network interface module as recited in claim 1, wherein the provider circuitry comprises at least one provider circuit board, and the first electrical connector is a board connector for electrically connecting to the provider circuit board.

5. The network interface module as recited in claim 4, wherein the board connector is a board-receiving connector configured to extend from the module thereby allowing the board-receiving connector to pass through an opening in a wall of the network interface unit between the provider and the subscriber sections.

6. The network interface module as recited in claim 1, wherein the second electrical connector is an insulation displacement connector for terminating a pair of solid insulated wires.

7. The network interface module as recited in claim 1, wherein the subscriber circuitry comprises a circuit board upon which is mounted the first electrical connector and the second electrical connector.

8. A network interface unit for use in a telecommunication system comprising:
    a housing having a partition that defines a service provider section and a subscriber section, wherein the service provider section is secured and inaccessible to the public except through an opening in the partition;
    provider circuitry mounted in the service provider section and having a connection interface;
    wherein the subscriber section is adapted to receive a network interface module in an installed position, the module comprising:
        a first electrical connector adapted for electrically connecting to the connection interface of the provider circuitry;
        a second electrical connector adapted for electrically connecting to subscriber signal lines;
        subscriber circuitry configured electrically connecting the first electrical connector to the second electrical connector; and
    wherein the network unit is configured to receive the module such that, during placement of the module in the installed position, the electrical connection between the first electrical connector and the provider circuitry and the installation of the module in the subscriber section are effected in a single step.

9. The network interface unit as recited in claim 8, wherein the subscriber section has a mounting surface defining guide groves and the provider section contains a provider circuit board, the guide groves being adapted to receive mounting members of the module such that the module is in sliding engagement with the mounting surface to position the module in the installed position, wherein, during the motion of sliding the module into the installed position, the electrical connection between the fist electrical connector and the provider circuit board and the installation of the module in the subscriber section are performed in a single step.

10. The network interface unit as recited in claim 8, further comprising the module.

11. The network interface unit as recited in claim 10, wherein the module further comprises mounting member being profiled to effect mating of the first electrical connector with the circuit board upon motion of the module toward the provider circuit board.

12. The network interface unit as recited in claim 10, further comprising a test receptacle mounted on the module and configured to electrically connect to the first electrical connector when a plug is inserted therein.

13. The network interface unit as recited in claim 10, wherein the first electrical connector extends from the module thereby enabling it to pass through the opening from the subscriber section into the service provider section.

14. The network interface unit as recited in claim 10, wherein the connector interface extends from the provider circuitry thereby enabling it to pass through the opening from the service provider section to the subscriber section.

15. The network interface unit as recited in claim 10, wherein the provider circuitry comprises at least one provider circuit board and the first electrical connector comprises a board-receiving connector for electrically connecting to the provider circuit board.

16. The network interface unit as recited in claim 15, wherein the board-receiving connector extends through the partition to electrically connect to the connection interface.

17. The network interface unit as recited in claim 15, wherein the connector interface extends through the partition to electrically connect to the board-receiving connector.

18. The network interface unit as recited in claim 10, wherein the first electrical connector is a board-receiving connector for receiving the connection interface, and the connection interface is an extending portion of the provider circuit board upon which circuit traces are disposed.

19. A network interface module for use with a network interface unit of a telecommunication system, the network interface unit having a subscriber section and a provider section, the subscriber section having a mounting surface defining guide groves, and the provider section containing a provider circuit board, the module comprising:

a printed circuit board;

at least one electrical connector mounted on the printed circuit board for connecting to subscriber signal lines;

at least one board-receiving electrical connector mounted on the printed circuit board for connecting to traces on a service the provider circuit board, wherein the at least one electrical connector and the at least one board-receiving electrical connector are electrically connected through the printed circuit board; and mounting feet connected to the printed circuit board for cooperating with the guide grooves of the mounting surface in the subscriber section, the mounting feet being positioned to allow sliding engagement of the module with the mounting surface to position the module in an installed position, wherein, during the motion of sliding the module into the installed position, the electrical connection between the board receiving connector and the provider circuit board and the installation of the module in the subscriber section are performed in a single step.

20. The network interface module as recited in claim 19, further comprising a test receptacle having a switching mechanism which disconnects the first and second electrical connectors when a plug is inserted the receptacle while electrically connecting the inserted plug to the first electrical connector.

21. The network interface module as recited in claim 19, wherein the second electrical connector is an insulation displacement connector.

22. A network interface module for use with a network interface unit of a telecommunication system, the unit having a subscriber section and a provider section, the provider section containing a provider circuit board, the module comprising:

first electrical connector means for establishing electrical connection to a service provider circuit wherein mating and unmating of the electrical connector with the service provider circuit is effected by motion of the module during its installation and removal, respectively, from the network interface unit, wherein the electrical connection between the first electrical connector and the provider circuit and the installation of the module in the network interface unit are performed in a single step, and the electrical disconnection between the electrical connector and the provider circuit and the removal of the module from the network interface unit are performed in a single step;

second electrical connection means for establishing electrical connection between the module and a subscriber line; and interconnection means for interconnecting the electrical connector and the electrical connection means.

23. The network interface module as recited in claim 22, wherein the first electrical connector means comprises a board-receiving connector capable of establishing electrical connections to traces on the surface of a provider circuit board.

24. The network interface module as recited in claim 22, wherein the second electrical connection means comprises an insulation displacement connector for terminating a pair of insulated subscriber wires.

25. The network interface module as recited in claim 22 wherein the interconnection means comprises a circuit board.

26. The network interface module as recited in claim 22 further comprising a test receptacle having switching means for disconnecting the first and second electrical connector means when a plug is inserted into the receptacle while electrically connecting the inserted plug to the first electrical connector means.

* * * * *